UNITED STATES PATENT OFFICE.

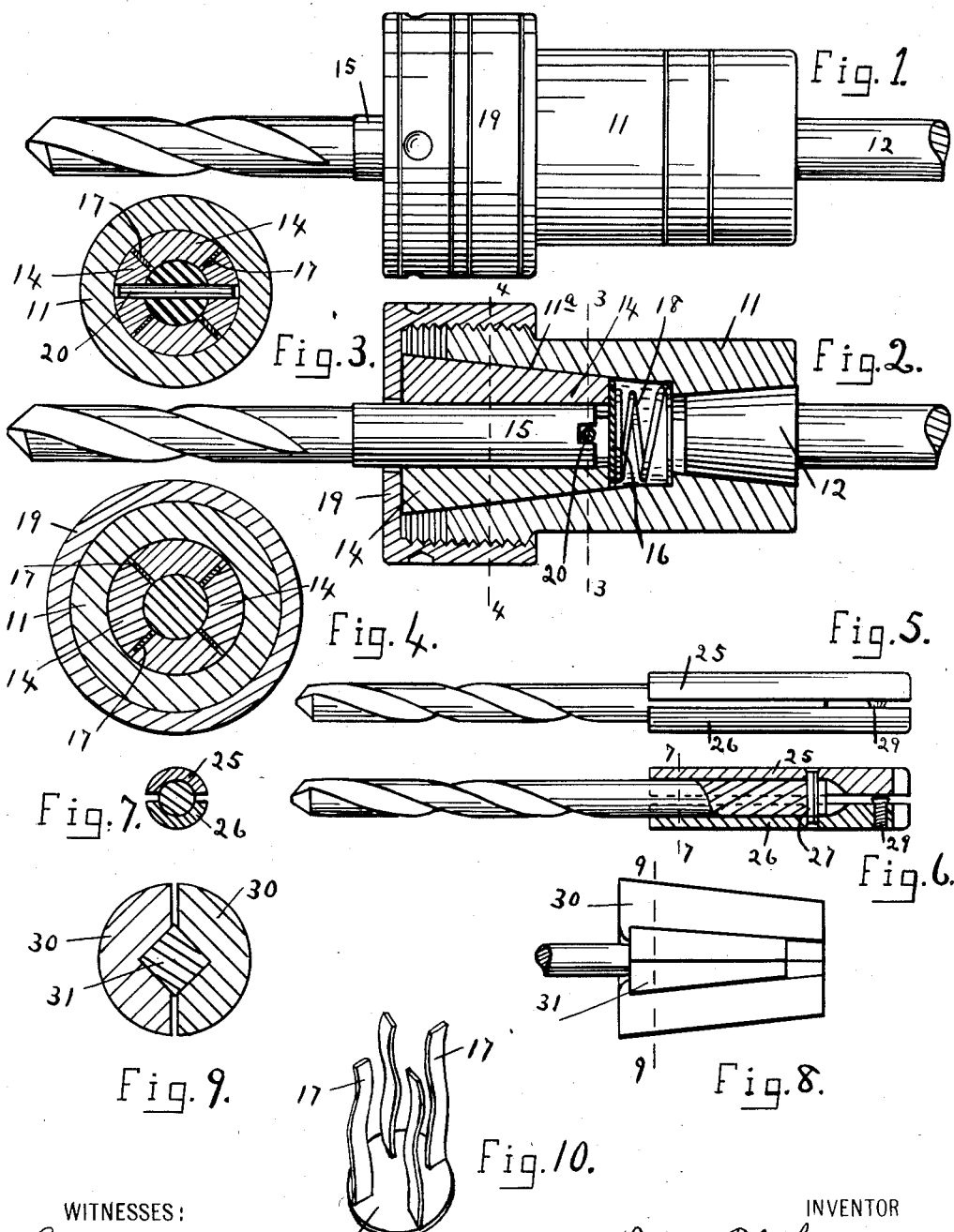

PETER PFEIFER, OF DURHAMVILLE, NEW YORK.

DRILL-CHUCK.

No. 905,919.　　　　Specification of Letters Patent.　　　Patented Dec. 8, 1908.

Application filed May 20, 1908. Serial No. 433,864.

*To all whom it may concern:*

Be it known that I, PETER PFEIFER, of Durhamville, in the county of Oneida and State of New York, have invented certain new and useful Improvements in Drill-Chucks; and I do hereby declare that the following is a full, clear, and exact description thereof, which will enable others skilled in the art to which it appertains to make and use the same, reference being had to the accompanying drawings, and to the letters of reference marked thereon, which form part of this specification.

The object of my present invention is to provide an improved drill chuck, which is simple in construction, efficient in operation and well adapted to meet the requirements of such a device in actual use.

Figure 1 shows a side elevation of my improved chuck with a drill in position therein. Fig. 2 is a longitudinal sectional view of the same. Fig. 3 is a cross section on line 3, 3 of Fig. 2. Fig. 4 is a cross section on line 4, 4 of Fig. 2. Fig. 5 is a side elevation of a clamping bushing which may be employed in connection with the drill chuck for handling drills of reduced shank diameters shown in connection with a drill in position therein. Fig. 6 is a longitudinal sectional view of the same. Fig. 7 is a cross section taken on line 7, 7 of Fig. 6. Fig. 8 shows a jaw of a modified form of construction with the shank of a bit in position in connection therewith. Fig. 9 is a section through a pair of jaws of the construction shown in Fig. 8, together with the shank of a bit in position therein taken on line corresponding to 9, 9 of Fig. 8. Fig. 10 is a perspective view of a base plate with fingers employed in connection with the construction shown in Figs. 1 to 4 inclusive.

Referring to the reference letters and figures in a more particular description, 11 indicates the chuck body which is of general cylindrical form and preferably provided in its base end with a socket to receive the spindle 12 by means of which the chuck is mounted in a drill press lathe or other suitable machine. In the opposite end the body is provided with a tapering or conical socket 11ª, which receives a set of jaws 14, which taken together are externally of a general conical form adapted to fit the socket 11ª. As to their inner faces when taken together, the set of jaws are adapted to provide a drill shank opening adapted to receive the shank 15 of a drill, or for that matter any other piece which it may be desired to insert therein. The inner ends of the jaws 14 bear upon or rest against a base plate 16, which is of sufficiently reduced diameter to pass to its innermost position in the socket without wedging and is provided with fingers 17 received in cracks or open spaces between the adjoining sides of the jaws. These fingers 17 are preferably thin, light, resilient material and made corrugated or wavy, whereby they act as springs to spread the jaws when opening but with or without this function provide separators for the jaws and mutual supporting means for the jaws and plate when not forced together into the socket. The base plate 16 serves to even the jaws up longitudinally and as a bearing for one end of the spring 18, which is introduced in the lower end of the socket 11ª and confined under pressure operating to force the jaws outwardly with reference to the socket. A cap 19 is provided over the end of the chuck which has an opening suitable to allow the passage of the drill shank, and is internally screw-threaded and engages with screw threads on the end of the chuck body. Extending across the space which receives the drill shank and engaging at either end in the jaws 14 is provided a positive drive pin 20. The inner face of the drill shank may be provided with a notch or recess to fit over and engage with this positive drive pin 20.

It is evident that as the screw cap is turned off from the body it will be followed up by the jaws 14 impelled by the spring 18 for a reasonable distance. The jaws will also be opened in a circumferential way by the operation of the fingers 17. When sufficiently opened up a drill shank may be introduced between the jaws, when by screwing the cap on to the chuck body the jaws will be forced into the conical socket 11ª and closed together until they tightly grip the shank of the drill. At the same time care may be exercised to have the notch in the lower end of the drill engage on the positive drive pin 20. The friction grip on the jaws of the drill will ordinarily be sufficient to drive it but the positive drive insures the drill being held against rotation even though the jaws are not gripping with sufficient power.

Ordinary sizes of drills from say threequarters of an inch down, may be had with a uniform size of drill shank, say one-half inch in diameter. In view of this fact, these drill chucks are made preferably so that the inner face of the jaws is adapted to fit and grip a drill shank of one-half inch in diameter. In order, however, to adapt the chuck for use with that class of drills where the diameter of the shank varies with the diameter of the drill, there is provided a set of adjustable bushing clamps consisting of two half cylinders 25 and 26 held and coupled together by a cross pin 27, which engages in each loosely. The slight heads on the pin 27 prevent the parts from becoming separated and at the same time allows them to be freely closed together by the jaws of the drill chuck in gripping a shank of smaller diameter. The pin 27 also serves as a positive drive for the drill inserted in a bushing, while the bushing in its base end is provided with a slot 28 adapting it to engage with the positive drive pin 20 of the chuck jaws. In order to concentrate the grip of the bushing on the outer end, there may be provided in one of the parts as 26 an adjustable screw 29, which the opposite part is adapted to bear. It is evident that when the bushing is inserted in the drill chuck and a drill shank is inserted within the bushing, upon tightening the chuck the chuck jaws will close the bushing on to the shank of the drill tightly gripping it, and the positive drive is still secured.

In order to adapt the chuck for use with wood bits having heads square on cross section and tapering in form in lieu of the said jaws 14, I may substitute a pair of jaws as 30. The pair of jaws 30 as to their exteriors are of the general conical form of the socket in the chuck body, while as to their inner faces they are provided with half sockets adapted to fit and receive the square head as 31 of a wood bit. The operation of this form of construction is similar to that previously described and quite obvious. It, however, might be noted that the cap needs to be loosened to a larger extent to allow the jaws to open sufficiently to place or withdraw the bit head.

Other modifications and changes in and from the construction herein described may be made without departing from the spirit of my invention.

What I claim as new and desire to secure by Letters Patent is:

1. The combination in a chuck of a body having a conical socket, a set of jaws together of the same general conical form externally as the socket and having a shank opening within, a positive drive pin extending across the shank opening and mounted in the jaws, and a cap screw-threaded on to the body and arranged to force the jaws into the socket, substantially as set forth.

2. The combination in a chuck of a body having a conical socket, a set of jaws together of the same general conical form externally as the socket and having a shank opening within, a base plate engaging against the inner ends of the jaws having fingers projecting between the jaws, an expelling spring behind the base plate in the socket, and a screw cap on the body arranged to force the jaws into the socket, substantially as set forth.

3. The combination in a chuck of a body having a conical socket, a set of jaws together of the same general conical form externally as the socket and having a shank receiving opening within, a base plate engaging against the inner ends of the jaws having resilient spring fingers projecting between the jaws, an expelling spring in the jaw socket beneath the jaws and base plate, and a screw cap on the body arranged to force the jaws into the socket, substantially as set forth.

4. A clamping bushing consisting of two substantially semi-cylindrical parts together having a longitudinal internal socket, a loose pin spanning the inner end of the internal socket and forming a holding connection between the parts and a positive drive for a tool having a recessed end inserted in the socket, substantially as set forth.

In witness whereof, I have affixed my signature, in presence of two witnesses, this 15th day of May 1908.

PETER PFEIFER.

Witnesses:
SARAH E. CLARK,
EMMA S. HESSE.